United States Patent
Roth (10) Patent No.: US 12,382,970 B2
(45) Date of Patent: *Aug. 12, 2025

(54) ARTICLES INCLUDING UNDENATURED MEAT PROTEIN

(71) Applicant: Empirical Innovations, Inc., Dakota Dunes, SD (US)

(72) Inventor: Nicholas A. Roth, North Sioux City, SD (US)

(73) Assignee: empirical innovations, inc., Dakota Dunes, SD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,317

(22) Filed: Feb. 7, 2024

(65) Prior Publication Data
US 2024/0237679 A1    Jul. 18, 2024

Related U.S. Application Data

(63) Continuation of application No. 18/209,401, filed on Jun. 13, 2023, now Pat. No. 11,896,040, and a
(Continued)

(51) Int. Cl.
*A23L 3/00* (2006.01)
*A23B 2/00* (2025.01)
(Continued)

(52) U.S. Cl.
CPC .............. *A23B 2/001* (2025.01); *A23B 2/003* (2025.01); *A23B 2/28* (2025.01); *A23B 2/42* (2025.01);
(Continued)

(58) Field of Classification Search
CPC . A23L 3/001; A23L 3/003; A23L 3/18; A23L 3/22; A23L 3/08; B01F 23/23;
(Continued)

(56) References Cited

U.S. PATENT DOCUMENTS 2,022,419 A * 11/1935 Horneman ................ A23C 7/04
99/452
2,022,420 A * 11/1935 Hammer ................ A23C 13/08
426/511
(Continued)

FOREIGN PATENT DOCUMENTS

AU          610233       5/1991
CN       204888558 U    12/2015
(Continued)

OTHER PUBLICATIONS

Jelen, P., "Experience with Direct and Indirect U Ht Processing of Milk—A Canadian Viewpoint," Journal of Food Protection. vol. 45, No. 9, pp. 878-883 Jul. 1, 1982.
(Continued)

*Primary Examiner* — Eric S Stapleton
(74) *Attorney, Agent, or Firm* — Fish & Richardson P.C.

(57) ABSTRACT

An article includes a heating medium injector, a mixture flow path, and a vacuum chamber. The heating medium injector has a heating medium path connected to receive a heating medium such as steam and a product path connected to receive undenatured meat protein. The heating medium injector also includes a mixing structure and a mixture outlet. The mixing structure comprises a structure within the heating medium injector at which the heating medium path and product path merge and the mixture outlet is connected to receive material from the mixing structure. The mixture flow path defines a mixture flow path volume and is connected at one end to the mixture outlet of the heating medium injector and at the opposite end to the vacuum chamber. Undenatured meat protein is contained within the vacuum chamber outside of the mixture flow path volume.

15 Claims, 5 Drawing Sheets

Related U.S. Application Data continuation of application No. 16/792,949, filed on Feb. 18, 2020, now Pat. No. 11,864,572.

(60) Provisional application No. 62/808,778, filed on Feb. 21, 2019.

(51) Int. Cl.
*A23B 2/28* (2025.01)
*A23B 2/42* (2025.01)
*A23B 2/46* (2025.01)
*A23B 4/005* (2006.01)
*A23B 5/005* (2006.01)
*A23B 11/137* (2025.01)
*B01F 23/23* (2022.01)
*B01F 23/231* (2022.01)

(52) U.S. Cl.
CPC .............. *A23B 2/46* (2025.01); *A23B 4/0053* (2013.01); *A23B 5/0055* (2013.01); *A23B 11/137* (2025.01); *B01F 23/23* (2022.01); *B01F 23/23121* (2022.01); *A23V 2002/00* (2013.01)

(58) Field of Classification Search
CPC ............. B01F 23/23121; A23B 4/0053; A23B 5/0055; A23B 5/005; A23C 3/037; A23V 2002/00
USPC ............................................. 99/447; 261/115
See application file for complete search history.

(56) References Cited

U.S. PATENT DOCUMENTS

| | | | | |
|---|---|---|---|---|
| 2,737,374 A * | 3/1956 | Terrett | F04F 5/462 | 261/78.2 |
| 2,852,042 A * | 9/1958 | Lynn | F28F 13/12 | 165/174 |
| 2,909,985 A * | 10/1959 | Abrams | A23L 3/22 | 99/348 |
| 2,975,069 A * | 3/1961 | Laguilharre | A23C 3/0375 | 202/182 |
| 2,999,024 A * | 9/1961 | Stimpson | A23L 15/00 | 426/614 |
| 3,016,815 A * | 1/1962 | Hanrahan | A23C 3/037 | 99/468 |
| 3,093,487 A * | 6/1963 | Jones | A23B 5/041 | 426/614 |
| 3,387,784 A * | 6/1968 | Ward, Jr. | C21C 5/04 | 239/428 |
| 3,450,022 A * | 6/1969 | Engel | A23L 3/22 | 366/337 |
| RE27,790 E * | 10/1973 | Rusoff et al. | A23J 3/22 | 426/507 |
| 3,922,376 A * | 11/1975 | Strinning | A23C 9/1504 | 426/42 |
| 3,927,974 A * | 12/1975 | Johansson | A23C 3/0375 | 422/26 |
| 3,973,048 A * | 8/1976 | Sollerud | A23C 3/037 | 165/66 |
| 3,988,112 A * | 10/1976 | Johansson | A61L 2/07 | 422/26 |
| 4,200,149 A * | 4/1980 | Pechner | F28F 13/12 | 138/42 |
| 4,234,537 A * | 11/1980 | Hersom | A23L 3/165 | 422/26 |
| 4,375,185 A * | 3/1983 | Mencacci | A23L 3/18 | 422/26 |
| 4,419,301 A * | 12/1983 | Nahra | A23C 3/037 | 261/129 |
| 4,461,780 A * | 7/1984 | Menacci | A23C 3/0375 | 426/511 |
| 4,591,463 A * | 5/1986 | Nahra | A23L 3/003 | 99/453 |
| 4,689,237 A * | 8/1987 | Fabre | A23L 3/22 | 99/453 |
| RE32,695 E * | 6/1988 | Nahra | A23C 3/0375 | 261/129 |
| 4,773,827 A * | 9/1988 | Zaiser | F28C 3/08 | 417/183 |
| 5,271,376 A * | 12/1993 | Lu | F24H 3/105 | 165/177 |
| 5,375,654 A * | 12/1994 | Hougland | F28F 13/12 | 165/181 |
| 5,443,857 A * | 8/1995 | Arph | A23C 3/037 | 426/511 |
| 5,558,819 A * | 9/1996 | Den Hollander | A23L 3/24 | 261/21 |
| 5,622,655 A * | 4/1997 | Cincotta | F28C 3/08 | 261/76 |
| 5,727,452 A * | 3/1998 | Jensen | A23C 3/037 | 99/452 |
| 5,842,497 A * | 12/1998 | Drifka | B01F 25/312 | 137/100 |
| 5,881,638 A * | 3/1999 | Kjærulff | A23J 3/08 | 99/452 |
| 5,893,270 A * | 4/1999 | Arph | A23L 3/22 | 62/65 |
| 5,914,255 A * | 6/1999 | Grae | C12H 1/16 | 422/38 |
| 6,082,712 A * | 7/2000 | Cincotta | B01F 25/3122 | 261/76 |
| 6,217,926 B1 * | 4/2001 | Merkle | A23K 10/30 | 426/490 |
| 6,277,610 B1 * | 8/2001 | Grae | C12N 15/88 | 422/38 |
| 6,299,343 B1 * | 10/2001 | Pekerman | B01F 25/31243 | 366/144 |
| 6,361,025 B1 * | 3/2002 | Cincotta | B01F 25/313 | 261/DIG. 78 |
| 6,410,284 B1 * | 6/2002 | Aksenov | A23L 3/16 | 422/38 |
| 6,579,706 B2 * | 6/2003 | Grae | C12N 13/00 | 435/173.5 |
| 6,662,549 B2 * | 12/2003 | Burns | B63H 11/02 | 60/221 |
| 7,037,694 B2 * | 5/2006 | Aksenov | A23L 3/0155 | 422/38 |
| 7,108,882 B2 * | 9/2006 | Schaefer | A23B 4/0053 | 426/644 |
| 7,111,975 B2 * | 9/2006 | Fenton | F04F 5/465 | 366/163.2 |
| 7,152,851 B2 * | 12/2006 | Cincotta | F28C 3/06 | 261/77 |
| 7,227,104 B2 * | 6/2007 | Ghislain | A47J 37/0676 | 219/524 |
| 7,434,982 B2 * | 10/2008 | Nagasawa | B01F 25/3132 | 366/147 |
| 7,449,314 B2 * | 11/2008 | Grae | C12N 15/88 | 435/173.5 |
| 7,601,377 B2 * | 10/2009 | Aksenov | A23L 3/24 | 426/492 |
| 7,673,628 B1 * | 3/2010 | Shulman | F24C 15/36 | 126/332 |
| 8,193,395 B2 * | 6/2012 | Fenton | C12M 45/02 | 568/840 |
| 8,246,015 B2 * | 8/2012 | Schreib | F28C 3/06 | 261/76 |
| 8,419,378 B2 * | 4/2013 | Fenton | F04F 5/14 | 417/187 |
| 9,010,379 B2 * | 4/2015 | Gothard | B01F 33/811 | 417/174 |
| 9,011,953 B2 * | 4/2015 | Kowalik | A23C 3/037 | 422/26 |
| 9,207,017 B2 * | 12/2015 | Zaiser | B01F 23/23121 | |
| 9,615,593 B2 * | 4/2017 | Simunovic | A61L 2/10 | |
| 9,629,377 B2 * | 4/2017 | Zietlow | A23C 19/0917 | |
| 9,751,742 B2 * | 9/2017 | Hayakawa | B67C 7/0073 | |

(56) References Cited

U.S. PATENT DOCUMENTS

| | | | | |
|---|---|---|---|---|
| 9,775,363 | B2* | 10/2017 | Rispal | A22C 7/0076 |
| 9,930,898 | B2* | 4/2018 | Deane | A23C 3/0335 |
| 11,864,572 | B2* | 1/2024 | Roth | B01F 23/23 |
| 11,896,040 | B2* | 2/2024 | Roth | B01F 23/23121 |
| 2002/0168734 | A1* | 11/2002 | Grae | C12N 13/00 |
| | | | | 435/173.1 |
| 2003/0035752 | A1* | 2/2003 | Aksenov | A23L 3/005 |
| | | | | 422/26 |
| 2004/0023351 | A1* | 2/2004 | Grae | C12N 13/00 |
| | | | | 435/173.5 |
| 2006/0199258 | A1* | 9/2006 | Aksenov | A23L 3/005 |
| | | | | 435/283.1 |
| 2006/0236874 | A1* | 10/2006 | Ozanne | A47J 31/4485 |
| | | | | 99/452 |
| 2009/0251989 | A1* | 10/2009 | Pfefferle | B01F 25/31322 |
| | | | | 366/340 |
| 2011/0287161 | A1* | 11/2011 | Weber | A23L 33/40 |
| | | | | 426/631 |
| 2013/0228348 | A1* | 9/2013 | Worthy | B05B 7/0433 |
| | | | | 239/398 |
| 2016/0029666 | A1* | 2/2016 | Carpenter | A23K 10/18 |
| | | | | 424/93.3 |
| 2016/0143343 | A1* | 5/2016 | Schmied | A23L 3/22 |
| | | | | 422/108 |
| 2017/0347680 | A1* | 12/2017 | Valentini | A23C 21/08 |
| 2019/0344233 | A1* | 11/2019 | Savino | B01F 27/091 |

FOREIGN PATENT DOCUMENTS

| | | |
|---|---|---|
| EP | 0674538 B1 | 6/1996 |
| EP | 0805714 B1 | 9/1999 |
| EP | 0958745 A2 | 11/1999 |
| EP | 1604731 B1 | 12/2005 |
| GB | 270046 | 5/1927 |
| GB | 2154121 A | 9/1985 |
| JP | 2000262594 A | 9/2000 |
| JP | 2010535029 A | 11/2010 |
| WO | 0056161 A1 | 9/2000 |
| WO | 2005084451 A1 | 9/2005 |
| WO | 2008060218 A1 | 5/2008 |
| WO | 2014037296 A1 | 3/2014 |

OTHER PUBLICATIONS

Tuan, Truong Ho, "Fouling of stainless steel surfaces by heated whole milk: a thesis presented in partial fulfilment of the requirements for the degree of Doctor of Philosophy in Food Technology," Institute of Food, Nutrition & Human Health, University of Massey, NZ 2001, title pages, p. i-xi, and pp. 61-81.

* cited by examiner

ARTICLES INCLUDING UNDENATURED MEAT PROTEIN

CROSS-REFERENCE TO RELATED APPLICATIONS

Applicant claims the benefit, under 35 U.S.C. § 120, of U.S. patent application Ser. No. 18/209,401 filed Jun. 13, 2023, and entitled "Articles Including Undenatured Meat Protein and Water Condensed from Steam," and of U.S. patent application Ser. No. 16/792,949 filed Feb. 18, 2020, and entitled "Systems and Methods for Receiving the Output of a Direct Stream Injector," now U.S. Pat. No. 11,864,572. The entire content of each of these prior applications is incorporated herein by this reference.

Applicant also claims the benefit, under 35 U.S.C. § 119(e), of U.S. Provisional Patent Application No. 62/808,778 filed Feb. 21, 2019, and entitled "Direct Heating Medium Injector and Injection System and Method." The entire content of this provisional application is incorporated herein by this reference.

TECHNICAL FIELD OF THE INVENTION

The invention relates to neutralizing pathogens in undenatured meat proteins by steam or other heating medium injection, and to articles containing treated undenatured meat proteins.

BACKGROUND OF THE INVENTION

Heat treatment is used in the food processing industry to eliminate pathogens and for other purposes. For example, milk may be heated to about 145° for about thirty minutes, or to about 162° F. for about fifteen seconds to destroy or deactivate disease-causing microorganisms found in milk. These heat treatment processes are commonly referred to as pasteurization. Milk or cream may also be treated by heating to 280° F. to 302° F. for two to six seconds (or more) in a process referred to as ultra-high-temperature ("UHT") pasteurization. Pasteurization and UHT pasteurization may not entirely sterilize the product being treated but may be effective for killing or deactivating biological pathogens or agents present in the product.

Heat treatment of liquid or otherwise pumpable materials like milk and cream may be indirect or direct. In indirect heat treatment systems, the heating medium remains separate from the foodstuff and heat is transferred to the foodstuff in a heat exchange device such as a shell and tube or plate-type heat exchanger. In contrast to indirect heat treatment systems, direct heat treatment systems bring the foodstuff into direct contact with steam. Although this direct contact adds water to the foodstuff being treated, that added water may be separated from the treated foodstuff as desired.

Direct steam heat treatment systems may be divided generally into steam infusion systems and steam injection systems. In steam infusion systems, steam is directed through a steam inlet into a suitable steam chamber and the product to be treated is directed into the steam chamber through a separate product inlet, commonly a diffuser plate including a number of passages through which relatively fine streams of product may flow into the steam chamber. U.S. Pat. No. 4,591,463 describes examples of steam infusion systems. In steam injection systems, steam may be injected into a stream of foodstuff flowing through a conduit to rapidly increase the temperature of the foodstuff to a desired treatment temperature. The added steam and product may then be held at an elevated temperature for a desired time by causing the mixture to flow through a hold conduit. U.S. Pat. No. 2,022,420 provides an example of a steam injection system.

In both steam infusion and steam injection systems, the water added to the product during treatment may be removed from the product by applying a vacuum sufficient to vaporize the added water and then drawing off the water vapor. This vaporization of added water also has the effect of rapidly decreasing the temperature of the now heat-treated product. In the case of steam infusion systems, the water and heated product are removed from the steam chamber and then directed to a vacuum chamber for applying the desired vacuum. In the case of steam injection systems, the mixture of heated product and added water is directed from the hold conduit into a vacuum chamber where the added water is vaporized and may be drawn off along with any remaining steam.

Although direct steam injection systems are commonly used for heat treating foodstuffs such as milk and juices, problems remain which increase the cost of operating such systems. Perhaps the most persistent problem encountered in direct steam injection systems is the deposition of materials from the product, milk proteins in the case of milk treatment for example, on surfaces within the steam injector and downstream from the injector. These deposits can reduce flow through the system and must be removed periodically to allow proper operation. This removal of deposits necessitates the shut-down of the treatment system and these pauses in production increase operation costs and reduce productivity. In applications beyond dairy products, deposition may be so rapid that passages carrying the product to be treated become completely plugged in a very short period of time, a few seconds or a few minutes. The deposition problem thus prevents prior direct steam injection systems from being used for heat treating certain products, such as products including raw (that is, uncooked) meat proteins or egg proteins.

SUMMARY OF THE INVENTION

An article according to a first aspect of the present invention includes a heating medium injector, a mixture flow path, and a vacuum chamber. The heating medium injector has a heating medium path connected to receive a heating medium such as steam through a heating medium inlet and also has a product path connected to receive undenatured meat protein (the product to be treated) through a product inlet. This undenatured meat protein received at the product path of the heating medium injector may be referred to in this disclosure and in the accompanying claims as "input undenatured meat protein" to help distinguish the material from undenatured meat protein at other locations in the article. The heating medium injector also includes a mixing structure and a mixture outlet. The mixing structure comprises a structure within the heating medium injector at which the heating medium path and product path merge. The mixture outlet is connected to receive material from the mixing structure. The mixture flow path defines a mixture flow path volume and is connected at one end to the mixture outlet of the heating medium injector and at the opposite end to the vacuum chamber. The article according to this first aspect of the invention further includes undenatured meat protein contained within the vacuum chamber outside of the mixture flow path volume. This undenatured meat protein contained in the vacuum chamber outside of the mixture flow path volume comprises product that has been subjected to heat treatment in the heating medium injector and mixture flow path and thus may be referred to in this disclosure and in the accompanying claims as "treated undenatured meat protein" to help distinguish the material from undenatured meat protein at other locations in the article.

An article in accordance with a second aspect of the invention includes the mixture flow path extending from the injector, particularly a steam injector, to the vacuum chamber. The mixture flow path defines a mixture flow path volume containing a heated mixture including undenatured meat protein and water condensed from steam that has been placed in direct contact with a stream of input undenatured meat protein at the steam injector. This undenatured meat protein in the mixture flow path volume may be referred to in this disclosure and the accompanying claims as "heated undenatured meat protein" to help distinguish the material from undenatured meat protein at other locations in the article. As with articles in accordance with the first aspect of the invention, articles according to the second aspect of the invention include undenatured meat protein (treated undenatured meat protein) contained within the vacuum chamber outside of the mixture flow path volume.

Some embodiments under either aspect of the invention may be configured such that the mixture flow path traverses a wall of the vacuum chamber. In these embodiments, at least some of the mixture flow path is defined by a conduit contained within the vacuum chamber. In some of these embodiments having a conduit within the vacuum chamber, at least some of the mixture flow path may be defined by a conduit outside of the vacuum chamber and connected to the conduit contained within the vacuum chamber.

In an article in accordance with either of the above-referenced aspects of the invention, the vacuum chamber may be elongated and be oriented with the longitudinal axis extending vertically. Where the mixture flow path is defined at least in part by a conduit contained within the vacuum chamber, at least part of that conduit may extend vertically as well, particularly, in alignment with the vacuum chamber vertically oriented longitudinal axis.

Some implementations of an article within the scope of the present invention further include a mixture flow path cooling structure. In these implementations, surfaces forming at least some of the mixture flow path defined by the conduit contained within the vacuum chamber are in substantial thermal communication with the mixture flow path cooling structure. As used here and elsewhere in this disclosure and the following claims, "substantial thermal communication" with a surface means in thermal contact with the surface across one or more heat conductive materials so as to facilitate the transfer of heat in a direction from the surface away from the flow path across the one or more heat conductive materials to effect reasonable control of the temperature of the surface. For example, a cooling structure such as a coolant fluid circulating chamber separated from a given surface by a wall of material 0.25 inches thick or less having a thermal conductivity of at least approximately 10 W/m K would be in substantial thermal communication with the given surface. A thicker wall at this thermal conductivity could still provide substantial thermal communication within the scope of the present invention, albeit with reduced capability of providing the desired temperature control. Additional examples of structures in substantial thermal communication with a given surface will be described below in connection with the illustrated embodiments. It has been found that cooling some of the surfaces defining the mixture flow path within the vacuum chamber prevents undue deposition of product constituents, even in cases where the product being treated comprises a product that could not previously be treated by direct steam injection, such as products including undenatured (raw) meat proteins for example.

Articles in accordance with aspects of the present invention may be used in systems that receive a stream of undenatured meat protein, rapidly heat the undenatured meat protein by direct contact with the heating medium to destroy or deactivate any pathogenic microorganisms that may be present in the input undenatured meat protein, and then quickly cool the material before it is denatured. The vacuum applied to the vacuum chamber may be a vacuum sufficient to ensure that substantially all heating medium added as a consequence of the direct injection is converted to vapor within the vacuum chamber to both facilitate rapid cooling of the treated undenatured meat protein released into the vacuum chamber volume and to facilitate removal of the heating medium from the treated undenatured meat protein. Where the heating medium comprises steam, a suitable pressure applied to the vacuum chamber volume through a suitable port to the vacuum chamber may be between approximately 29.5 inches of mercury to approximately 25.5 inches of mercury.

These and other aspects, advantages, and features of the invention will be apparent from the following description of representative embodiments, considered along with the accompanying drawings.

DESCRIPTION OF REPRESENTATIVE EMBODIMENTS

Figure 1:
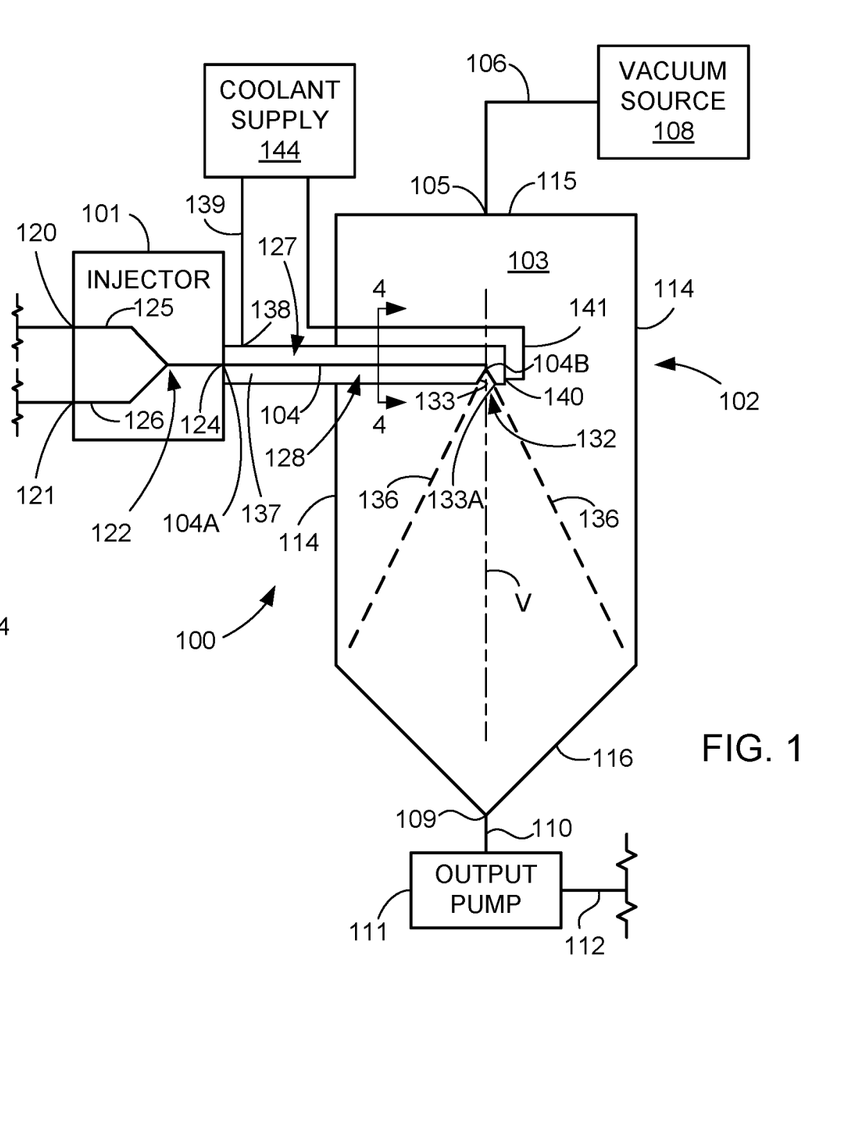
FIG. 1 is a schematic representation of a steam injection system embodying principles of the present invention.

Referring to FIG. 1, a steam injection system 100 includes a steam injector (direct steam injector) 101 and a vacuum chamber 102. Vacuum chamber 102 includes a vacuum port 105 connected by a suitable vacuum conduit 106 to a vacuum source 108, and also includes an outlet port 109 connected by a suitable product outlet conduit 110 to an output pump 111. Steam injection system 100 also includes a mixture flow path which extends from injector 101 to vacuum chamber 102. In this case the mixture flow path is defined by a hold conduit 104 extending from steam injector 101 to a location within the interior of vacuum chamber 102, that is, a location within vacuum chamber volume 103.

Vacuum chamber 102 comprises a suitable vessel which defines the vacuum chamber volume 103. In particular, vacuum chamber 102 includes lateral walls 114, a top wall 115 and cone-shaped bottom wall 116 which together define vacuum chamber volume 103. Vacuum chamber 102 may be elongated along a vertical axis V as shown in FIG. 1 and may be generally cylindrical in shape along that axis. This vertical orientation of vacuum chamber 102 provides operational advantages which will be described further below in connection with the operation of steam injection system 100. However, implementations of a steam injection system according to the present invention are by no means limited to use with a vacuum chamber with a vertical orientation as shown in the example of FIG. 1.

Steam injector 101 is located outside of vacuum chamber volume 103 and includes a steam inlet 120 and a product inlet 121. Steam injector 101 also includes a mixing structure shown generally at 122 in FIG. 1, and a mixture outlet 124. Generally, mixing structure 122 includes a structure in which a steam path 125 and product path 126 merge within the injector to allow the steam and relatively cooler product to mix to thereby effect a rapid temperature increase in the product to a desired treatment temperature. Mixing structure 122 may for example, include a suitable chamber formed within injector 101 which includes a suitable inlet from steam path 125 and a suitable inlet from product path 126 to provide the desired mixing of the steam and product. Mixture outlet 124 comprises an outlet from steam injector 101 through which the heated mixture, that is, heated product, any remaining steam, and any condensed water, may exit the steam injector.

Examples of direct steam injectors that may be used in a steam injection system according to the present disclosure such as steam injection system 100 are described in U.S. Pat. No. 10,674,751 entitled "Heating Medium Injectors and Injection Methods for Heating Foodstuffs." It should be appreciated, however, that although steam injectors according to the above-noted patent are well suited for use in steam injection systems according to the present invention, other direct steam injectors may be employed for steam injector 101 shown in FIG. 1.

Figure 2:
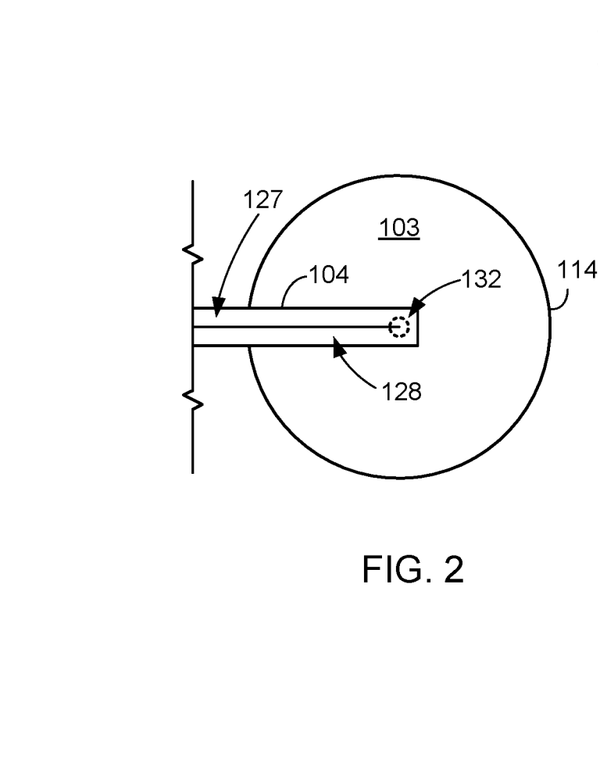
FIG. 2 is a schematic representation showing the location at which a heated mixture may be released in the vacuum chamber shown in FIG. 1.

The mixture flow path defined in this example system 100 by hold conduit 104 begins at a mixture inlet opening 104A operatively connected to mixture outlet 124 of steam injector 101. The mixture flow path defined by hold conduit 104 includes a segment generally indicated at reference numeral 127 which is located outside of vacuum chamber volume 103 and a segment generally indicated at reference numeral 128 which is located within the vacuum chamber volume. Thus the mixture flow path here defined by hold conduit 104 traverses a wall (in this case wall 114) of vacuum chamber so that a portion of a mixture flow path volume is contained within vacuum chamber 102. In this particular implementation, hold conduit 104 extends to an outlet end 104B connected to a nozzle 132 which is located substantially in the center of vacuum chamber volume 103 along the vacuum chamber vertical axis V. Nozzle 132 in this example represents a release component situated to release a heated mixture into vacuum chamber volume 103. The extension of hold conduit 104 into the vacuum chamber volume 103 is shown also in FIG. 2. The mixture flow path shown in FIG. 1 terminates at the nozzle surfaces 133 of nozzle 132. These nozzle surfaces 133, which define a mixture release volume in this example, make up the surfaces of the flow path segment 128 adjacent to a mixture release opening 133A (defined at the lowermost end of nozzle surfaces 133 in the orientation of FIG. 1 and representing a nozzle outlet in this example) to the vacuum chamber volume. In particular, mixture release opening 133A in this example is located at an outlet end of the mixture release volume defined by nozzle surfaces 133 and defines a passage from the mixture release volume to the portion of the vacuum chamber volume 103 external to the mixture release component. As will be described further below in connection with the operation of steam injection system 100, nozzle 132 is adapted to cause the material (heated mixture) exiting the mixture flow path and mixture release volume defined by the nozzle to form a downwardly-opening, cone-shaped stream indicated by dashed lines 136 in FIG. 1.

In example system 100, the surfaces of the mixture flow path along its entire length are in substantial thermal communication with a cooling structure. The cooling structure in this example comprises a coolant fluid circulating chamber shown generally at reference numeral 137 extending along the entire length of the mixture flow path including both segment 127 and segment 128 (and including along the nozzle surfaces 133 defining the mixture release volume in this example). Thus in this example, coolant fluid circulating chamber 137 includes both a mixture flow path structure (chamber portion along hold conduit 104) and a nozzle surface cooling structure (chamber portion along nozzle surfaces 133). A coolant inlet port 138 to coolant fluid circulating chamber 137 is fed by coolant supply line 139 and a coolant outlet port 140 is connected to a coolant return line 141. Coolant supply line 139 and coolant return line 141 are each operatively connected to a coolant supply 144. It will be appreciated by those skilled in the art that coolant supply 144 may include a suitable cooling or refrigerating system and a circulating pump, neither of which are shown in the drawing. The cooling or refrigerating system functions to cool a suitable coolant fluid to a desired temperature as will be described further below, while the circulating pump functions to direct the coolant fluid to coolant fluid circulating chamber 137 through coolant supply line 139 and coolant inlet port 138. Coolant return line 141 allows the coolant fluid to return to coolant supply 144 once the coolant fluid has flowed along the length of coolant fluid circulating chamber 137. It should be noted here that coolant fluid circulating chamber 137 is preferably isolated from the mixture flow path so that there is no mass transfer from the coolant fluid circulating chamber 137 to the mixture flow path or vice versa, that is, no mixing of coolant fluid and product being treated. The coolant fluid circulating chambers described below for other implementations according to the invention likewise isolate the respective chambers from the respective mixture flow path.

Figure 3:
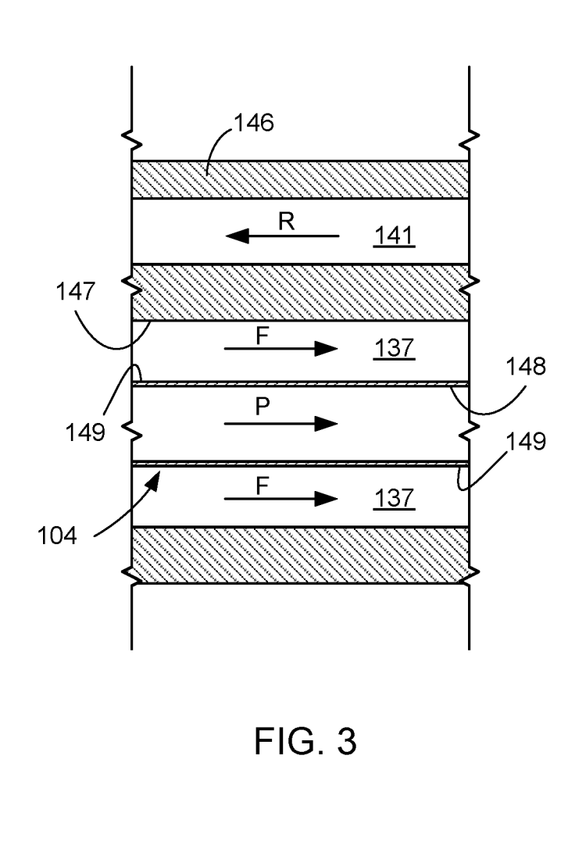
FIG. 3 is a longitudinal section view of a portion of a hold conduit within the scope of the present invention.
Figure 4:
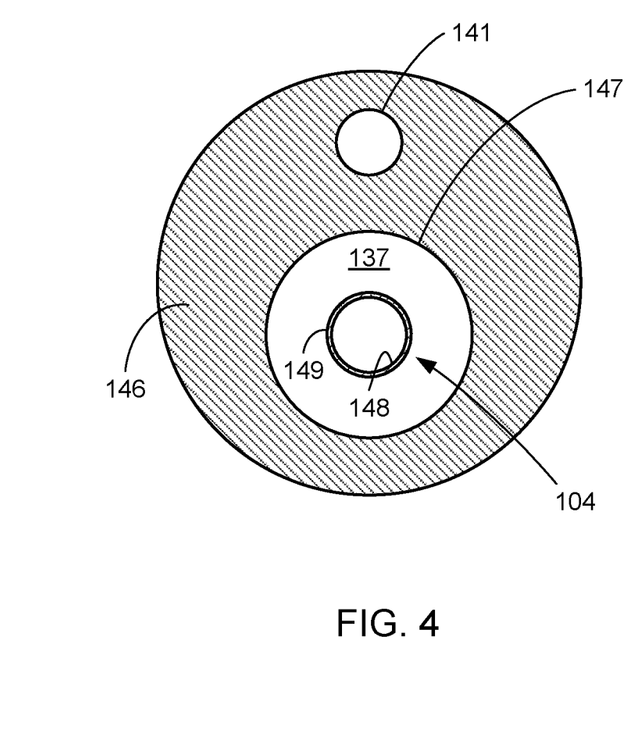
FIG. 4 is a transverse section view along line 4-4 in FIG. 1 employing the hold conduit shown in FIG. 3.

The section views of FIGS. 3 and 4 show an implementation of the hold conduit 104 and cooling structure represented by coolant fluid circulating chamber 137 shown schematically in FIG. 1. In particular, FIG. 3 comprises a section view of a portion of the length of the hold conduit 104 and cooling structure according to a particular embodiment. It can be assumed that this short length of the structure represents a portion encompassing the section line 4-4 in FIG. 1. The transverse section view of FIG. 4 can be assumed to be along section line 4-4 in FIG. 1. As such, FIGS. 3 and 4 show both the hold conduit 104, coolant fluid circulating chamber 137, and a flow passage representing a portion of coolant return line 141. The particular implementation of FIGS. 3 and 4 includes an elongated cylindrical body 146 having a cylindrical passage which provides a portion of coolant return line 141. A larger cylindrical passage defined by surface 147 receives hold conduit 104 so as to define an annular flow path around the hold conduit and this annular flow path represents coolant fluid circulating chamber 137. The internal surface 148 of hold conduit 104 defines the mixture flow path through the conduit while the outer surface 149 of hold conduit 104 defines an inner surface of coolant fluid circulating chamber 137. In this arrangement, a coolant fluid introduced into coolant fluid circulating chamber 137 may flow along the annular chamber defined between surfaces 147 and 149 in the direction from the left to the right in the orientation of FIG. 1 and indicated by arrows F in FIG. 3. Coolant fluid that has travelled the length of hold conduit 104 flows along the passage defining coolant return line 141 in the direction indicated by arrow R. The flow of coolant fluid as indicated by arrows F places the coolant fluid in position to facilitate a transfer of heat from the surface 148 of the hold conduit as the product and steam mixture flow along hold conduit 104 in the direction indicated by arrow P in FIG. 3. This heat transfer is across the wall of hold conduit 104 defined between inner surface 148 and outer surface 149, which is preferably as thin as possible to facilitate better heat transfer. For example, this wall defined between inner surface 148 and outer surface 149 may be preferably formed from a suitable food handling grade material such as a stainless steel having a relatively high thermal conductivity, preferably over approximately 10 W/(mK).

In the operation of system 100, and referring particularly to FIG. 1, steam is introduced into steam inlet 120 of injector 101 and directed along steam flow path 125 to mixing structure 122 while the product to be treated, such as undenatured meat protein for example, is introduced into product inlet 121 and directed along product path 126 to mixing structure 122. The two streams mix within mixing structure 122 to form a heated mixture of heated product, any remaining steam, and any water condensed from the steam, and this heated mixture stream exits injector 101 through mixture outlet 124. From injector 101, the mixture including heated product, water condensed from the applied steam, and any remaining steam is directed through hold conduit 104, both segment 127 and segment 128, to nozzle 132 within vacuum chamber volume 103 which defines the mixture release opening 133A for the heated mixture stream within the vacuum chamber volume. Hold conduit 104 has a sufficient volume and the flow rate is controlled so that the product being treated is held at the desired elevated treatment temperature for a desired period of time before being released into vacuum chamber volume 103 through mixture release opening 133A of nozzle 132. Thus, in the example where the product is undenatured meat protein, just prior to release of the heated mixture though mixture release opening 133A into vacuum chamber volume 103, the undenatured meat protein in the heated mixture within the mixture release volume defined by nozzle surfaces 133 is at the desired treatment temperature (in a range between approximately 158° F. and approximately 200° F. as described further below) and present together with water condensed from the steam applied in injector 101 and together with any remaining steam.

Once the heated mixture stream of heated product, any remaining steam, and water that has been condensed from the steam is released into the vacuum chamber volume, the relatively low pressure (which may be between approximately 29.5 inches of mercury to approximately 25.5 inches of mercury for example) causes the water in the mixture to vaporize so that it can be drawn off through vacuum port 105 together with any remaining steam. The vaporization of the water within vacuum chamber volume 103 rapidly reduces the temperature of the now treated product and the cooled product may collect in the bottom of vacuum chamber 102 where it may be drawn off through outlet port 109 and outlet conduit 110 by output pump 111. In this particular system, output pump 111 pumps the treated product through system outlet conduit 112 for further processing. The downwardly facing cone-shaped stream produced by nozzle 132 in system 100 has the effect of increasing the surface area of liquids in the released stream to enhance the vaporization of water for removal through vacuum port 105. The position of nozzle 132 in the center of vacuum chamber 102 together with the downwardly facing nozzle arrangement helps ensure that product does not contact the internal surfaces of the vacuum chamber walls 114 and 116 immediately upon release from the nozzle into the vacuum chamber volume 103. This helps prevent significant deposition of product constituents on the inner surfaces of the vacuum chamber walls.

While the mixture of heated product, remaining steam, and any condensed water flows through hold conduit 104 from left to right in the orientation of FIG. 1, coolant supply 144 is operated to direct coolant fluid through coolant inlet line 139 to inlet port 138. The coolant fluid may then flow along the length of coolant fluid circulating chamber 137 (including the portions adjacent to nozzle surfaces 133) to coolant outlet port 140 within vacuum chamber volume 103, and then return to coolant supply 144 through coolant return line 141. The coolant fluid is supplied at a temperature and at a flow rate sufficient to cool the surfaces making up the inner surface of conduit 104, such as inner surface 148 in the implementation shown in FIGS. 3 and 4, and to cool the nozzle surfaces 133. As described in more detail in the following paragraph, this cooling inhibits the deposition of constituents from the product along the surfaces of hold conduit both along segment 127 outside the vacuum chamber volume and along segment 128 within the vacuum chamber volume and including the nozzle surfaces 133.

Where cooling structures are used to cool surfaces so as to reduce deposition rates according to aspects of the present invention, the temperature to which the given surface is cooled is a temperature below temperatures at which product tends to adhere to a surface. This temperature will vary with the product being treated. For products including undenatured meat or egg proteins, for example, surfaces which are cooled by a cooling structure may be cooled to a temperature no more than approximately 135° F., and more preferably no more than approximately 130° F. Some products may tend to adhere to surfaces at higher temperatures than this example, while still other products may tend to adhere to surfaces at lower temperatures. The cooling structures in each case are operated in accordance with the invention to reach the desired operating temperature to resist the deposition of product constituents in operation of the injector according to the present invention.

Temperatures at which a given product tends to adhere to a surface may also vary with the total hold time for which the product is treated. For a given product, the surface temperature at which the product begins to adhere may be higher for shorter hold times and lower for longer hold times. Generally, it is not necessary to actively monitor the mixture flow path surfaces in order to maintain the surfaces at the desired operating temperature. Rather, cooling is performed as needed to limit the deposition of product constituents to an acceptable level.

Operating parameters of a steam injection system incorporating aspects of the present invention will depend in some cases on the particular product which is being treated and thus included in the heated mixture received from the direct steam injector such as injector 101 in FIG. 1. In particular, the treatment temperature and hold time along the mixture flow path will depend in large part upon the product being treated and the goal of the heat treatment. Where the product includes raw meat or egg proteins which are to remain undenatured over the course of the treatment, the goal of the treatment may be to destroy pathogens such as *Escherichia coli* (*E. coli*) O157:H7, *Salmonella*, *Listeria*, and *Campylobacter* bacteria and in this case the target treatment temperature for the product in the heated mixture stream may be between approximately 158° F. and approximately 200° F. and the hold time at that temperature until release into the vacuum chamber may be less than one second. Of course, the present invention is by no means limited to this temperature range and hold time, which are provided merely as an example of operation.

It will be noted from the example described above for products including raw meat or egg proteins that the treatment temperature of approximately 158° F. to approximately 200° F. is well above the temperature of a surface at which the product tends to adhere to the surface, namely, approximately 135° F. for example. Thus without the surface cooling in accordance with the present invention, surfaces within a hold conduit such as 104 in FIGS. 1-4 would quickly reach the adherence temperature and product deposits would quickly form. Cooling surfaces in accordance with the present invention prevents the given surfaces from reaching the adherence temperatures and thus reduces or eliminates product deposition on those surfaces.

In view of the function of coolant fluid circulating chamber 137 to provide a way to cool (remove heat from) the hold conduit inner surface 148 and nozzle surfaces 133, it will be appreciated that it is desirable in the operation of steam injection system 100 to ensure the coolant fluid flows throughout the chamber volume. In order to ensure this desired flow throughout the volume of the coolant fluid circulating chamber 137, and to ensure appropriate mixing of the coolant fluid, various dams, baffles, and other flow directing features, as well as turbulence inducing elements may be included within coolant fluid circulating chamber 137. Suitable flow directing features for used in coolant fluid circulating chambers or cooling jackets are well known in the art of heat exchange devices and are thus not shown either in the embodiment of FIGS. 3 and 4 or the schematic drawings of FIGS. 1 and 2.

The inner surface 148 of hold conduit 104 in FIGS. 3 and 4 is in substantial thermal communication with the cooling structure comprising coolant fluid circulating chamber 137 by virtue of the thermal conductivity of the material from which the hold conduit is formed (preferably over approximately 10 W/m K combined with the thickness of the material, which may be only approximately 0.02 inches to approximately 0.05 inches for example). Substantial thermal communication may also be provided through a thicker wall of material. Other arrangements providing substantial thermal communication between coolant fluid circulating chamber 137 and a hold conduit inner surface such as surface 148 in the example of FIGS. 3 and 4, may include multiple layers of material residing between the coolant fluid circulating chamber and inner wall. For example, a conduit such as conduit 104 may be formed from a thin layer of material having a first thermal conductivity and a second layer having the same or higher thermal conductivity.

The vertically oriented vacuum chamber 102 shown for example in FIG. 1 represents one preferred configuration because the orientation allows the heated mixture to be released at a location within the vacuum chamber volume that is well spaced-apart from vacuum port 105. This prevents product in the released heated mixture from being drawn out of the vacuum chamber through vacuum port 105. The vertically oriented vacuum chamber 102 and center release location well above the bottom walls 116 shown in FIG. 1 also enhances exposure of the released heated mixture to the reduced pressure maintained in the vacuum chamber. However, other vacuum chamber orientations may be used within the scope of the present invention. Also, although FIG. 1 shows vacuum chamber 102 having a cone-shaped bottom wall 116, a rounded bottom wall or other bottom wall arrangement may be used within the scope of the present invention.

Figure 5:
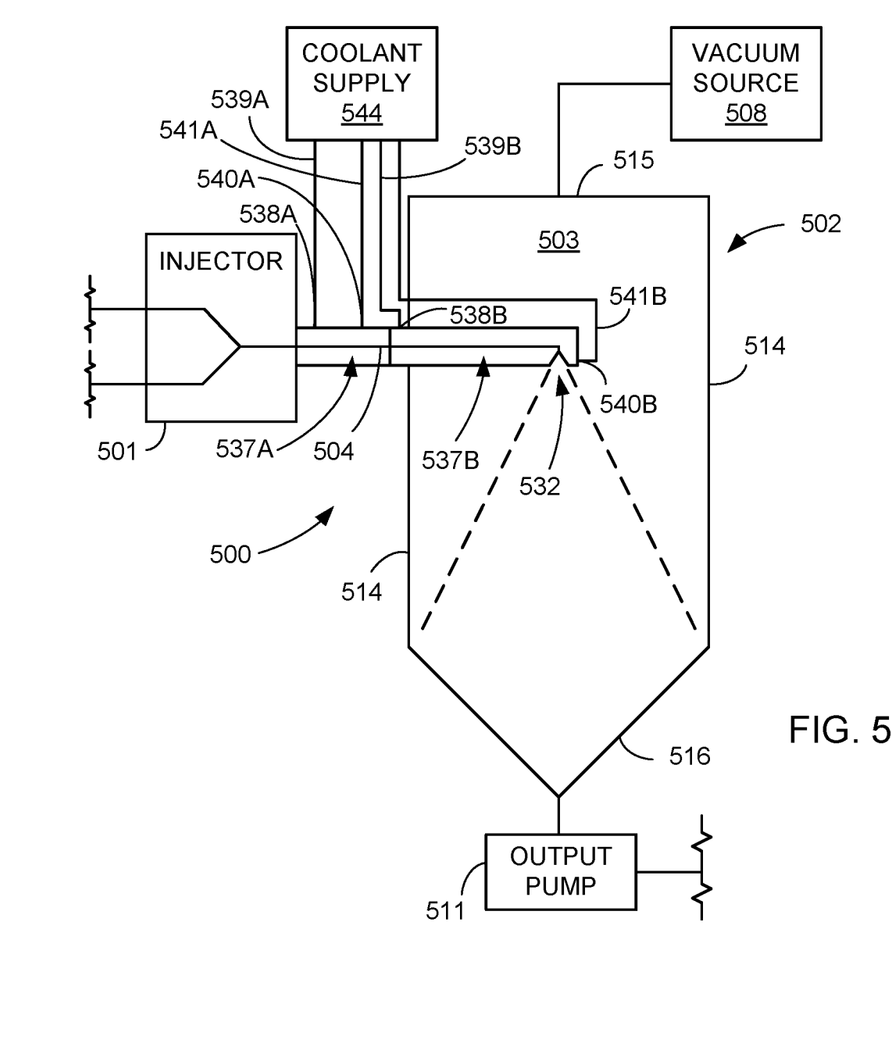
FIG. 5 is a schematic representation of a steam injection system similar to that shown in FIG. 1 but having an alternate hold conduit arrangement in accordance with the present invention.

FIG. 5 shows an alternate steam injection system 500 according to the present invention. System 500 includes a steam injector 501, vacuum chamber 502, vacuum source 508, output pump 511, coolant supply 544, and hold conduit 504 similar to that shown for system 100. Unlike system 100, system 500 includes a cooling structure for hold conduit 504 which is divided into two components. In particular, system 500 includes a separate cooling structure for portions of hold conduit 504 outside of the vacuum chamber volume 503 defined by vacuum chamber walls 514, 515, and 516, and a separate cooling structure for portions of the hold conduit within the vacuum chamber volume. This bifurcated cooling structure in system 500 includes a suitable coolant fluid circulating chamber 537A with a coolant inlet port 538A fed by coolant input line 539A, and a coolant outlet port 540A connected to a coolant return line 541A. The portion of the cooling structure associated with the segment of hold conduit 504 within the vacuum chamber volume 503 includes a coolant fluid circulating chamber 537B having a coolant inlet port 538B fed by coolant input line 539B, and a coolant outlet port 540B connected to coolant supply 544 through coolant return line 541B. The two different cooling structures shown in system 500 may be desirable to ensure that the desired level of cooling is provided for surfaces along all of hold conduit 504. The operation of system 500 is similar to that described above for system 100 except that coolant fluid is circulated through both coolant fluid circulating chamber 537A and coolant fluid circulating chamber 537B simultaneously while the mixture of heated product, remaining steam, and condensed water is directed through hold conduit 504 to the release opening at nozzle 532 within the vacuum chamber volume 503.

Figures 6, 7:
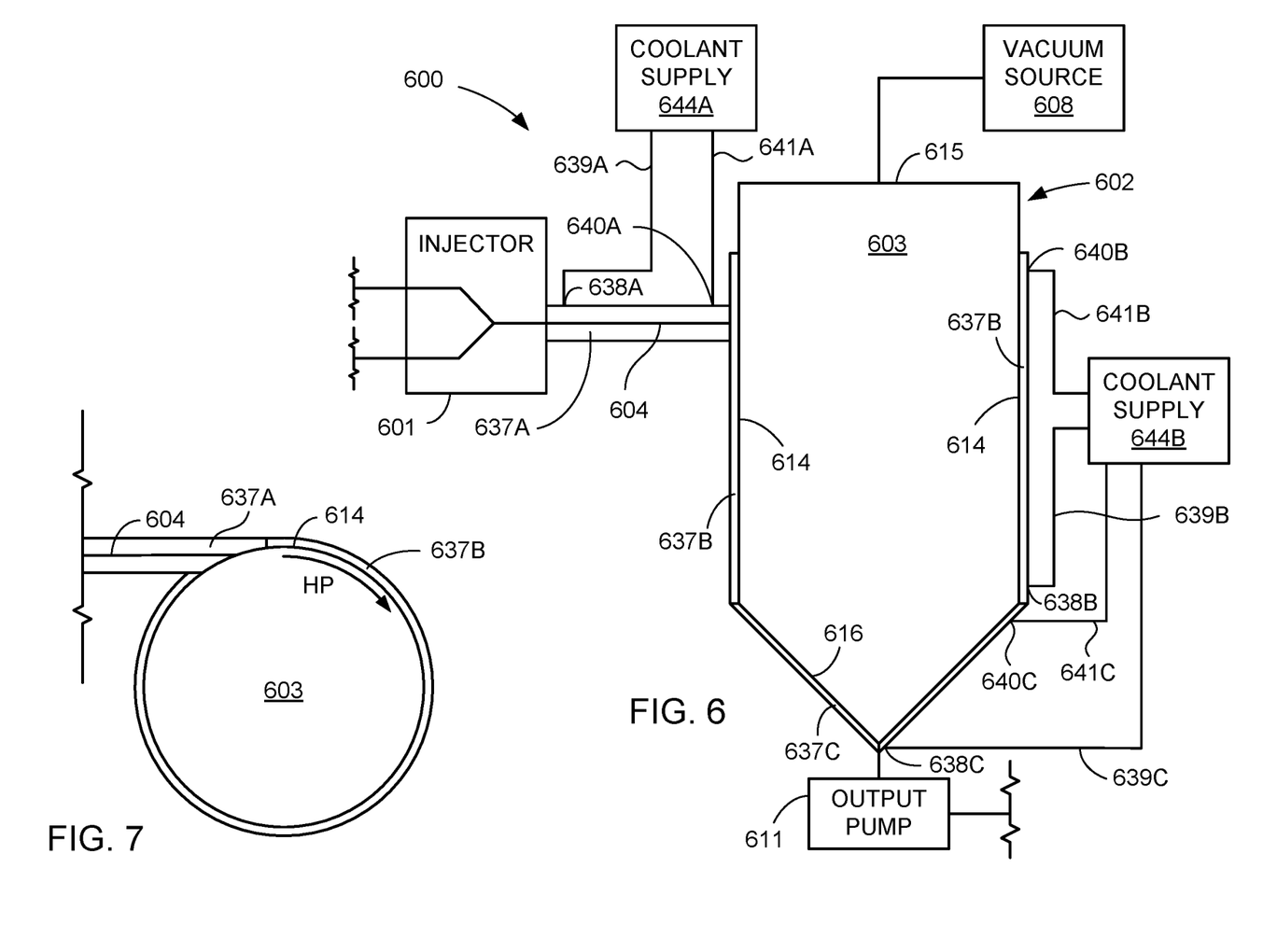
FIG. 6 is a schematic representation of an alternate steam injection system embodying principles of the present invention.
FIG. 7 is a schematic representation showing the location at which a heated mixture may be released in the vacuum chamber shown in FIG. 6.

FIG. 6 shows an alternate steam injection system 600 which includes a different arrangement for introducing the mixture of heated product, remaining steam, and any condensed water into the vacuum chamber volume 603. Similarly to steam injection system 100 shown in FIG. 1, system 600 includes a steam injector 601 and a vacuum chamber 602 having walls 614, 615, and 616 defining vacuum chamber volume 603. Vacuum chamber 602 is connected to a vacuum source 608 and an output pump 611 similarly to system 100 shown in FIG. 1 and described above. System 600 in FIG. 6 also includes a hold conduit 604 which extends from steam injector 601 to vacuum chamber 602. A cooling structure is provided for hold conduit 604 comprising a coolant fluid circulating chamber 637A connected to a coolant supply 644A by coolant inlet port 638A and coolant inlet line 639A and by coolant outlet port 640A and coolant return line 641A. In the embodiment of FIG. 6, however, the mixture flow path is not formed entirely by a hold conduit or hold conduit and nozzle. Rather, hold conduit 604 defines a segment of the mixture flow path from steam injector 601 to vacuum chamber wall 614, and the segment of the mixture flow path within vacuum chamber volume 603 is defined by an inner surface of wall 614 of the vacuum chamber itself. As shown in FIG. 7, hold conduit 604 intersects vacuum chamber wall 614 essentially tangentially so that as the mixture flows out of the hold conduit it flows along the inner surface of vacuum chamber wall 614 as indicated by arrow HP in FIG. 7. Thus the liquids included in the mixture spread out in a thin layer along the inner surface of wall 614 (which represents a dispersal wall) in position to allow the vacuum applied to chamber volume 603 to vaporize water included in the mixture.

Because part of the mixture flow path is defined by the inner surface of vacuum chamber wall 614, system 600 further includes an arrangement according to the invention for inhibiting the deposition of constituents from the heated product on surface 617. Specifically, in the example of FIGS. 6 and 7 system 600 includes a cooling structure in substantial thermal communication with the inner surface of vacuum chamber wall 614. The illustrated cooling structure comprises a coolant fluid circulating chamber 637B having a coolant inlet port 638B fed by coolant inlet line 639B from coolant supply 644B. A coolant outlet port 640B and coolant return line 641B allow the coolant to return to coolant supply 644B. A second cooling structure associated with vacuum chamber 602 in example system 600 includes a coolant fluid circulating chamber 637C, connected to receive coolant from coolant supply 644B through coolant inlet port 638C and coolant inlet line 639C, and connected to return coolant to the coolant supply through coolant outlet port 640C and coolant outlet line 641C.

In operation of system 600 shown in FIGS. 6 and 7, as the mixture of heated product, remaining steam, and condensed water flows from steam injector 601 through hold conduit 604, the coolant supply 644A circulates a coolant fluid through coolant fluid circulating chamber 637A to cool the inner surface of the hold conduit similarly to the cooling for conduit 104 as described above in connection with system 100. Coolant supply 644B also circulates a coolant fluid through coolant fluid circulating chamber 637B in position to cool (remove heat from) the inner surface of vacuum chamber wall 614, and through coolant fluid circulating chamber 637C in position to cool the inner surface of vacuum chamber wall 616. The cooling of the inner surface of hold conduit 604 inhibits the deposition of material on those surfaces, while the cooling of the inner surface of vacuum chamber wall 614 and inner surface of wall 616 inhibits the deposition of materials on those surfaces.

The invention encompasses numerous variations on the above-described example systems. Such variations include variations related to the cooling structures described in the above examples. Generally, where a cooling structure is employed to remove heat from a surface forming part of a mixture flow path, the cooling structure may include any number of segments or elements to accomplish the desired cooling. For example, any number of separate or connected coolant fluid circulating chambers may be included for a given surface. Also, although the illustrated examples assume a certain direction of circulation through the coolant circulation chambers, the direction of circulation may be reversed from that described. Furthermore, the invention is not limited to cooling structures comprising coolant fluid circulating chambers to provide the desired cooling. Thermoelectric devices may also be used to provide the desired cooling of a given surface according to the present invention, as may forced air cooling arrangements in which air is forced over fins or other heat conductive arrangements in substantial thermal communication with the surface to be cooled. A cooling structure within the scope of the invention may also employ evaporative cooling to remove heat from the desired flow path surfaces. Also, different types of cooling structures may be used for different areas of a given surface to be cooled.

Figure 8:
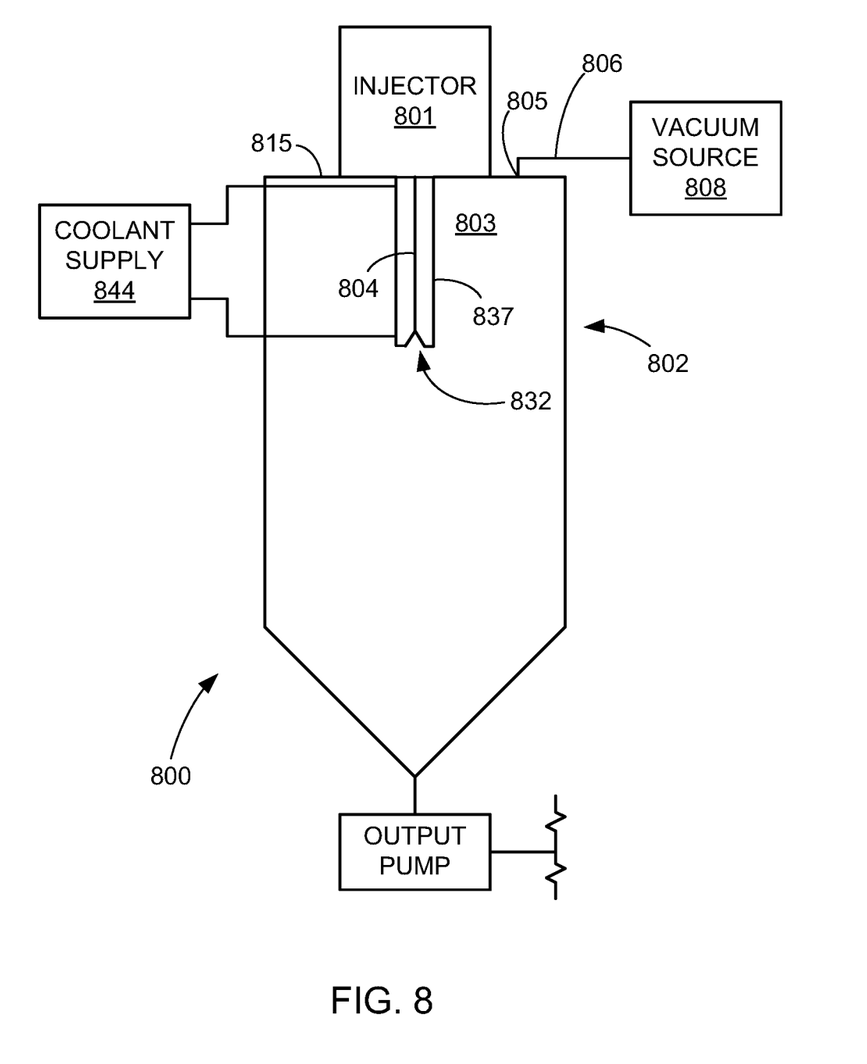
FIG. 8 is a schematic representation showing an alternate position for the direct steam injector and hold conduit as compared to the embodiment shown in FIG. 1.

Another variation on the illustrated examples that lies within the scope of the present invention includes an arrangement in which the entire mixture flow path between the mixture outlet of the direct steam injector and the release point is located within the vacuum chamber volume. For example, the direct steam injector in the system may be located above the top wall of the vacuum chamber with a hold conduit extending downwardly into the vacuum chamber volume. This arrangement is shown in the alternate stream injection system 800 of FIG. 8. Alternate system 800 includes a steam injector 801 and vacuum chamber 802 defining a vacuum chamber volume 803. A hold conduit 804 extends into vacuum chamber volume 803 from a top wall 815 of vacuum chamber 802 to a nozzle 832, and is generally aligned with the vacuum chamber vertically oriented longitudinal axis. A vacuum source 808 is included for applying a vacuum to vacuum chamber 802 through conduit 806 and vacuum port 805. A coolant supply 844 is connected by suitable conduits to a coolant circulating chamber 837 for hold conduit 804. All of these elements shown in system 800 correspond to the commonly named elements shown in FIG. 1. It is further possible that both the injector and the entire mixture flow path resides within the vacuum chamber volume. In this case both the injector and the hold conduit may be suspended or otherwise mounted in the vacuum chamber volume. In either of these cases the surfaces of the mixture flow path are, in accordance with the present invention, in thermal communication with one or more cooling structures.

For a given portion of a mixture flow path, a cooling structure may be immediately adjacent to the surface to be cooled. However, cooling structures such as coolant fluid circulating chambers may not be continuous, but may include dividers, baffles, turbulence inducing features, and other structures which prevent the coolant fluid circulating chamber from being continuous along a given surface. Such arrangements in which the coolant fluid circulating chamber may not be continuous over a given surface to be cooled remain within the scope of the present invention as set out in the claims.

It is also possible within the scope of the present invention that cooling structures do not extend along an entire mixture flow path or portion of the mixture flow path. For example, while FIGS. 1 and 5 indicate that the cooling structure (coolant circulating chamber 137 in FIG. 1 and chambers 537A and 537B in FIG. 5) extend along the entire hold conduit and the respective nozzle, portions along the length of the given hold conduit and nozzle (or other mixture release structure) may include no cooling structure. In some cases, depending upon the material being treated, treatment temperature, and hold time, it may be sufficient that the given surface is formed in a material which is resistant to deposit formation without active cooling. In particular, surfaces downstream from the steam injector in a treatment system may be formed in a temperature moderating material. As used in this disclosure, a "temperature moderating material" (sometimes referred to herein as "TMOD material") comprises a material having a specific heat of no less than approximately 750 J/kg K, and preferably no less than approximately 900 J/kg K, and, more preferably, no less than approximately 1000 J/kg K. A class of materials particularly suited for use as a TMOD material in accordance with the present invention comprises plastics which have a specific heat of no less than approximately 1000 J/kg K and are suitable for providing food contact surfaces, retain structural integrity, maintain dimensional stability, and do not degrade at temperatures which may be encountered in a steam injection system. Regardless of the specific TMOD material, "formed in" the given material means that the surface is either molded, machined, extruded, or similarly formed in or from a mass of the material, or formed by an additive manufacturing technique such as 3D printing, either with or without polishing or other treatment to achieve a desired surface smoothness.

Of course, where the product being treated is a foodstuff or pharmaceutical, a TMOD material must also be suitable for providing food contact surfaces. Suitable plastics for use as TMOD material include polyetherether ketone (PEEK), Nylon, Ultra-high-molecular-weight polyethylene (UHMWPE), polytetrafluoroethylene (Teflon), polyoxymethylene (POM or Acetal), and poly methyl methacrylate (acrylic), for example. These plastics suitable for use as TMOD material in accordance with the present invention may include various additives and may be used in both an unfilled composition or a filled (composite) composition, such as glass-filled or carbon-filled, provided the filled material remains suitable for food contact, retains the desired specific heat as described above in this paragraph, and is capable of providing the desired surface finish. Materials other than plastics may also be employed for TMOD material within the scope of the present invention. These materials include ceramics such as porcelain, glasses such as borosilicate glass (Pyrex) and rubber. These materials also include aluminum which has a specific heat of approximately 900 J/kg K and a thermal conductivity of approximately 240 W/m K, as well as magnesium and beryllium and alloys of these materials and Albemet. Materials having a specific heat of somewhat less than approximately 750 J/kg K but exhibit relatively high thermal conductivity may also represent a suitable substitute for a TMOD material. Such materials may have a specific heat of no less than approximately 650 J/kg K and a thermal conductivity of no less than approximately 100 W/m K and include silicon carbide for example. Also, a TMOD material within the scope of the present invention may comprise a mixture of materials and need not comprise a single material. For example, a TMOD material may comprise a mixture of different types of thermoplastics, or plastics and other materials such as quartz and epoxy resin composite materials for example, or may be made up of layers of metals, plastics, and other materials and combinations of such materials in different layers. A TMOD material also need not be continuous along a given surface. For example, a given surface formed in a TMOD material according to the present invention may be formed in PEEK over a portion of its length and may be formed in a different plastic or other TMOD material over another portion of its length.

It is also possible in accordance with the present invention to utilize cooling structures together with TMOD materials. Although not limited to such materials, this use of cooling structures is particularly applicable to TMOD materials such as Aluminum having high thermal conductivity. A given surface may be both formed in a TMOD material and be in substantial thermal communication with a cooling structure according to the following claims.

In the example treatment system configuration shown in FIG. 1, some or all of the inner surface of hold conduit 104 and some or all of nozzle inner surface 133 may be formed from a TMOD material for some applications. The TMOD material would be in lieu of coolant circulating chamber 137 or other cooling structure in these areas. In the example configuration of FIG. 5, some or all of the inner surface of hold conduit 504 and some or all of the inner surfaces of nozzle 532 may be formed from a TMOD material for some applications of the system. The TMOD material would be in lieu of coolant circulating chambers 537A and 537B or other cooling structure in these areas. In the example configuration shown in FIG. 6, some or all of the inner surface of hold conduit 604 and some or all of the inner surface of wall 614 may be formed from a TMOD material in lieu of a cooling structure in these areas. Furthermore, some implementations of the present invention may employ cooling structures only over a portion of the length of the heated mixture path such as hold conduit 104 in FIG. 1, while other portions of the length of the heated mixture path do not include a cooling structure and are not formed in a TMOD material. Referring to FIG. 1 for example, coolant circulating chamber 137 may not extend along the entire length of hold conduit 104. One or more portions along the length of hold conduit 104 either inside or outside the volume of vacuum chamber, may not be in substantial thermal communication with any adjacent cooling structure and may not be formed from TMOD material.

Surfaces which come in contact with the mixture of heated product, steam, and condensed water should have at least a suitable finish appropriate for the given product being treated in accordance with food handling standards. Generally, the surface roughness of any surface forming a portion of the mixture flow path should have a value of 32 RA microinches or less. Lower surface roughness values may enhance the deposition inhibiting performance of a cooled surface in accordance with the invention.

It will be appreciated that numerous connections, connectors, and fittings are required for connecting the various components included in a steam injection system embodying the principles of the present invention. These connections may be made with any suitable connecting structure or arrangement. For connections between elements defining the mixture flow path, the transition should be smooth and avoid changes in flow area.

The manner in which the heated mixture stream is released into a vacuum chamber such as vacuum chamber 102 in FIG. 1 is also subject to variation within the scope of the present invention. Although FIG. 1 shows a cone-shaped nozzle 132, other types of devices may be used to release the heated mixture from the hold conduit 104, preferably in thin streams of material. For example, rather than the illustrated nozzle 132, hold conduit 104 may terminate in a release chamber having a number of downwardly facing orifices sized to produce relatively thin streams of material in the vacuum chamber volume below the release level. In these cases, all of the surfaces of the release chamber to which the heated mixture stream or part of it is exposed are in substantial thermal communication with a cooling structure associated with the release chamber. As another example, the heated mixture may be released in the vacuum chamber volume via an impingement nozzle. As with other nozzle arrangements in accordance with the present invention, surfaces of an impingement nozzle which come in contact with the heated mixture may be in substantial thermal communication with a cooling structure. This includes the structure of the impingement nozzle on which the heated mixture stream impinges.

In the arrangement shown in FIGS. 6 and 7 in which the vacuum chamber wall 614 forms a portion of the mixture flow path, the entire surface of wall 614 need not be in thermal communication with a cooling structure. For example, coolant fluid circulating chamber 637B may not extend all the way down wall 614 to bottom wall 616. Rather, coolant fluid circulating chamber 637B may extend essentially from the level of vacuum chamber 603 at which heated mixture is released into the vacuum chamber to a lower level which is spaced apart from bottom wall 616 such that there is a vertical gap between the lowermost part of coolant circulating chamber 637B and wall 616 (and any coolant circulating chamber such as chamber 637C which is included along wall 616). Additionally, since the heated mixture may not contact the inner surface of wall 614 around the entire circumference of vacuum chamber 603, a coolant circulating chamber such as chamber 637B may extend along only a part of the circumference of the vacuum chamber, generally along only that portion of the wall 614 which is contacted by the heated mixture while components of the mixture are at a temperature at which deposits may form on the wall for a given material being treated. It may also be unnecessary for a given implementation to include any cooling structure for the bottom wall 616, and thus coolant circulating chamber 637C may be omitted in some systems in accordance with the principles of the present invention.

It should also be appreciated that while the system shown in FIG. 1 does not include any cooling structures for cooling the inner surfaces wall 116 at the bottom of vacuum chamber 102, cooling structures may be included along these walls as well. Such a cooling structure may comprise a structure such as that shown in the embodiment of FIG. 6 for wall 1016 for example. The inner surfaces of wall 116 in FIG. 1 do not represent surfaces which define the mixture flow path because the mixture has been subjected to the reduced pressure in vacuum chamber 102 for a substantial period of time before reaching wall 116. However, at least for some products to be treated, it may still be desirable for cooling the inner surfaces of wall 116 to reduce product deposition on these surfaces.

The mixture flow path in the cooled hold conduit 104 shown in FIGS. 3 and 4 is shown as plain cylindrical flow paths. It will be appreciated that a certain amount of mixing may be desired in the mixture of heated product, steam, and water as the mixture flows along the flow path to ensure the product being treated is evenly heated. This mixing may be accomplished in some implementations of the invention by including features along the mixture flow path to induce turbulence. Mixing inducing features along the mixture flow path may include various shaped protrusions that extend into the flow path from a conduit wall or recesses in the conduit wall or may include changes in shape of the inner surface defining the mixture flow path such that such inner surfaces define non-linear surfaces in the direction of flow. It will be appreciated that such mixing or turbulence-inducing features also include surfaces comprising surfaces of the mixture flow path. Thus the surfaces of any mixing or turbulence-inducing features within the hold conduit may also be in substantial thermal communication with one or more cooling structures.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. An article including:
   (a) a heating medium injector having a heating medium path connected to receive a heating medium through a heating medium inlet of the heating medium injector and also having a product path connected to receive input undenatured meat protein through a product inlet of the heating medium injector, the heating medium injector further including (i) a mixing structure at which the heating medium path and product path merge and (ii) a mixture outlet connected to receive material from the mixing structure;
   (b) a mixture flow path connected at one end to the mixture outlet of the heating medium injector and extending from the mixture outlet of the heating medium injector to a vacuum chamber, the mixture flow path defining a mixture flow path volume; and
   (c) treated undenatured meat protein contained within the vacuum chamber outside of the mixture flow path volume.

2. The article of claim 1 wherein the heating medium comprises steam.

3. The article of claim 2 wherein the mixture flow path traverses a wall of the vacuum chamber and at least some of the mixture flow path is defined by a conduit contained within the vacuum chamber.

4. The article of claim 3 wherein at least some of the conduit contained within the vacuum chamber includes mixture flow path surfaces that are in substantial thermal communication with a mixture flow path cooling structure.

5. The article of claim 3 wherein at least some of the mixture flow path is defined by a conduit outside of the vacuum chamber and connected to the conduit contained within the vacuum chamber.

6. The article of claim 3 wherein:
(a) the vacuum chamber has a vertically oriented longitudinal axis; and
(b) at least part of the conduit contained within the vacuum chamber extends vertically.

7. The article of claim 6 wherein at least part of the conduit contained within the vacuum chamber is aligned with the vacuum chamber vertically oriented longitudinal axis.

8. The article of claim 2 wherein a vacuum applied to the vacuum chamber is between approximately 29.5 inches of mercury to approximately 25.5 inches of mercury.

9. An article including:
(a) a mixture flow path extending from a steam injector to a vacuum chamber, the mixture flow path defining a mixture flow path volume containing a heated mixture including heated undenatured meat protein and water condensed from steam that has been placed in direct contact with input undenatured meat protein at the steam injector; and
(b) treated undenatured meat protein contained within the vacuum chamber outside of the mixture flow path volume.

10. The article of claim 9 wherein the mixture flow path traverses a wall of the vacuum chamber and at least some of the mixture flow path is defined by a conduit contained within the vacuum chamber.

11. The article of claim 10 wherein at least some of the conduit contained within the vacuum chamber includes mixture flow path surfaces that are in substantial thermal communication with a mixture flow path cooling structure.

12. The article of claim 10 wherein at least some of the mixture flow path is defined by a conduit outside of the vacuum chamber and connected to the conduit contained within the vacuum chamber.

13. The article of claim 10 wherein:
(a) the vacuum chamber has a vertically oriented longitudinal axis; and
(b) at least part of the conduit contained within the vacuum chamber extends vertically.

14. The article of claim 13 wherein at least part of the conduit contained within the vacuum chamber is aligned with the vacuum chamber vertically oriented longitudinal axis.

15. The article of claim 9 wherein a vacuum applied to the vacuum chamber is between approximately 29.5 inches of mercury to approximately 25.5 inches of mercury.

* * * * *